Oct. 15, 1963  R. E. YOUNG  3,106,940
MANUFACTURE OF FILAMENT WOUND ARTICLES HAVING
REINFORCEMENT FOR OPENINGS FORMED THEREIN
Filed July 10, 1961

RICHARD E. YOUNG
INVENTOR.

BY Ernest G. Peterson

AGENT

United States Patent Office 3,106,940
Patented Oct. 15, 1963

3,106,940
MANUFACTURE OF FILAMENT WOUND ARTICLES HAVING REINFORCEMENT FOR OPENINGS FORMED THEREIN
Richard E. Young, Rocky Hill, N.J., assignor to Hercules Powder Company, Wilmington, Del., a corporation of Delaware
Filed July 10, 1961, Ser. No. 122,876
8 Claims. (Cl. 138—125)

This invention relates to structural articles such as pressure vessels, rocket motor casings, pipes, and the like, with walls formed of multiple layers of intersecting strands of glass filament material integrally bonded together with a cured thermosetting resin binder and having one or more functional openings formed therein by cutting or severing the structural filament material. More particularly, this invention relates to such articles wherein structural reinforcement is provided in the portion of the wall surrounding each functional opening formed therein by cutting out the structural filament material, and to methods for providing such reinforcement.

In the manufacture of pressure vessels, rocket motor casings, and the like, having walls of intersecting strands of glass filament material integrally bonded together, it is generally necessary to provide one or more functional openings in the walls thereof for the attachment of various fittings such as valves, gauges and other instrumentation, feed lines, thrust burner nozzles, thrust retarding devices, etc. Such functional openings are most expediently made by cutting out the structural filamentary material after the article has been fabricated and cured. However, since the stresses resulting from internal pressure result in tension loads in the filamentary material of which the structural shell or wall of the article is composed, it will be easily seen that if holes are to be cut in the structural shell which sever the load-carrying filamentary material, that suitable means must be provided for transmitting these tension loads around the cut openings. Without suitable means for transmitting such tension loads, the structural wall of the article would be greatly weakened in the whole area surrounding any such opening.

It is, therefore, a primary object of the present invention to provide articles such as pressure vessels, rocket motor casings, pipes and the like having structural reinforcement in the peripheral portion of the wall of such articles surrounding each functional opening formed therein by cutting or severing the structural filamentary material of which the wall of the article is made.

It is a further object of the invention to provide methods for reinforcing the peripheral portion of the wall of such articles surrounding any functional opening formed therein by cutting or severing the structural filamentary material of which the wall of such articles is made.

It is a further object of the invention to provide improvements in articles such as pressure vessels, rocket motor casings, pipes, and the like, and improvements in the manufacture thereof.

To accomplish the purposes of this invention, a suitable reinforcing means must provide great girth strength for resisting the tendency to burst radially with respect to its own center as a result of the multiplicity of radial loads applied by all of the wall-forming filaments in the system which are cut to form an opening. Such reinforcing means must also be of such configuration as to generate a large surface area of contact with the wall-forming filaments which are cut. Desirably, such reinforcing means should be made very thin, so that they can be used in multiples for developing a maximum shear area of contact without unduly thickening the wall structure around the periphery of a functional opening.

The foregoing objects and purposes as well as others which will become apparent from the following description, are accomplished in accordance with this invention by incorporating and integrally bonding one or more thin-washer-like member or members of peripherally wound filament material into the wall structure surrounding each functional opening formed in the wall by severing the structural filamentary material of which the wall is constructed.

The invention will be further described in relation to preferred embodiments thereof, and with reference to the accompanying drawing forming part of the specification, wherein like reference symbols refer to like parts wherever they occur, and in which.

Figure 1:
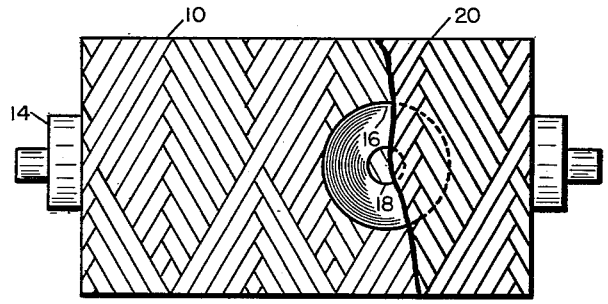
FIG. 1 is a development on a flat plane of half of a cylindrical winding mandrel illustrating the basic structural build-up of articles thereon in accordance with this invention, with the covering layer or layers of wall-forming filamentary material being cut away to show how the reinforcing members of this invention are interposed between adjacent layers of wall-forming filamentary material.
Figure 2:
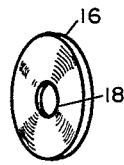
FIG. 2 is a perspective view illustrating an embodiment of a reinforcing member of peripherally wound filamentary material in accordance with this invention.

According to this invention and with reference to FIGS. 1 and 2, one or more layers of wall-forming filamentary material 10 impregnated with a curable thermosetting resin binder is placed on a forming surface such as the surface of a winding mandrel 14 or the surface of a mold form, and a thin washer-like member of peripherally wound filamentary material 16 for each functional opening to be cut in the structural shell of wall-forming filamentary material, and also impregnated with a curable thermosetting resin binder, is positioned on the surface of the thus placed wall-forming filamentary material so that the axial hole 18 in each such reinforcing member registers over the area of said wall-forming filamentary material to be cut out to form a functional opening, whereupon one or more additional layers of wall-forming filamentary material 20 impregnated with a curable thermosetting resin binder is applied over the initially placed wall-forming filamentary material and the reinforcing member or members.

The above steps thus provide a basic structure having a reinforcing member of peripherally wound filamentary material for each functional opening to be cut out of the wall-forming filamentary material, with such reinforcing member or members being interposed between adjacent layers of wall-forming filamentary material. For some purposes it has been found that a single reinforcing member of peripherally wound filamentary material for each functional opening provides sufficient structural reinforcement to resist rupture of the wall of the article when subjected to the stresses of internal pressure. However, for most purposes, it has been found that a plurality of such thin washer-like reinforcing members of peripherally wound filamentary material for each functional opening are necessary to provide sufficient structural reinforcement to resist rupture of the wall of the article when subjected to the stresses of internal pressure. Accordingly, therefore, additional reinforcing members of peripherally wound filamentary material for each functional opening, and additional layers of wall-forming filamentary material are alternately applied as necessary to produce a reinforced structural wall having the necessary strength properties. By alternately applying the additional reinforcing members and additional layers of wall-forming filamentary material, it is apparent, therefore, that each such reinforcing member is separated from other members in the reinforcement for a given opening by at least one layer of wall-forming filamentary material. The structural layup of multiple layers of wall-forming filamentary material with at least one interposed reinforcing member for each functional opening to be cut out, and impregnated with curable thermosetting resin binder, is then subjected to curing under suitable conditions of temperature and pressure to convert the resin binder to the insoluble, infusible, three dimensional cross-linked polymeric state and integrally bond the several elements of the structural layup together into a hardened wall or shell of filamentary material having reinforcing members of peripherally wound filamentary material incorporated and integrally bonded thereinto. After curing, the wall-forming filamentary material within the area bounded by the periphery of the axial hole 18 in the reinforcing member or members is then cut out to produce the desired functional opening or openings.

Figure 3:
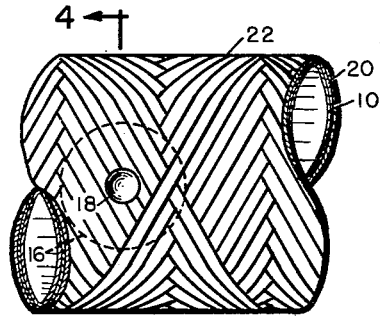
FIG. 3 is an elevation of a fragment of a hollow structural article in accordance with this invention.

FIG. 3 illustrates a fragment of a hollow structural article having structural reinforcement in accordance with this invention integrally bonded and incorporated into the wall structure surrounding a functional opening formed by cutting out the wall-forming filament material within the area bounded by the periphery of the axial hole in the reinforcement member.

Figure 4:
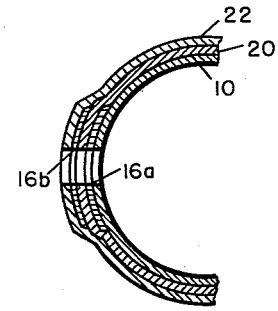
FIG. 4 is a fragmentary cross section taken in the direction of 4—4 in FIG. 3, enlarged to show details of construction.

FIG. 4 is a cross section, enlarged to show structural detail, of a portion of the wall of the article depicted in FIG. 3 taken through a typically reinforced functional opening. In FIG. 4 it is clearly seen that each reinforcing member for a given functional opening is separated from other reinforcing members in the same reinforcement by at least one layer of wall-forming filamentary material. Thus, reinforcing member 16a is interposed between layers 10 and 20 of wall-forming filamentary material, and reinforcing member 16b is interposed between layers 20 and 22 of wall-forming filamentary material. It will be understood, however, that the invention contemplates the employment of one or more such reinforcement members as necessary for each functional opening formed by cutting out the wall-forming structural filaments.

The wall-forming filamentary material of choice for the purposes of the present invention is fiber glass, and by preference, fiber glass in the form of continuous spun glass filaments, due to the great strength of this material, which is greater than that of any other known fiber. Moreover, in further describing the present invention, reference will be had to the method of filament winding described in U.S. Patent 2,843,153, for fabrication of the articles of this invention, since structural articles with walls of intermeshed helical glass filament windings integrally bonded together with a thermosetting resin binder, and made by the winding method of this patent, have unusually high strength to weight ratios. In fact, such articles have strength properties comparable to or superior to similar articles made of steel, and weighing much less. This matter of strength to weight ratio is of vital importance in the fabrication of rocket motor casings, for example.

In accordance with the description in U.S. Patent 2,843,153, a number of continuous glass filaments in band-like or strand-like form of the desired width are applied to a rotating mandrel by means of a filament delivery carriage which travels from one end of the mandrel to the other and back again. A circuit of a filament band thus applied is considered to be the complete path from the beginning of a righthand helix at one end of the mandrel, through the end pattern at the other end of the mandrel, back as a lefthand helix, plus the second end pattern and to the beginning of the next righthand helix, with reference to the mandrel being rotated counterclockwise as viewed from its righthand end. The pattern arrangement of the helical filament winding is determined by the number of such circuits or cycles to bring the filament band back adjacent to the location on the mandrel surface of the initial starting position. Thus a winding pattern can be based on a 1-circuit, a 2-circuit, a 3-circuit, a 4-circuit, etc. system of winding. Thus, in a 2-circuit system, the starting point of each succeeding circuit will be spaced 180° on the circumference of the mandrel from the starting point of the preceding winding circuit; in a 3-circuit system, the starting point of each succeeding circuit will be spaced 120° on the circumference of the mandrel from the starting point of the preceding circuit; etc.

Thus, in a 2-circuit pattern arrangement, for example, after the first circuit is completed, a second circuit is started commencing at a position at the righthand end of the mandrel at 180° away from the commencement of the first circuit. When the first and second circuits have been completed, forming what can be considered as a basic pattern, a sufficient change has been brought about by the gearing between the mandrel rotation and the filament delivery carriage to advance the mandrel exactly the width of the band of filaments. This gearing produces the progression by which the bands are laid down alongside of each other on the surface of the mandrel.

From the laying down of the circuits as just described, and by following the system described, it will be apparent that the diamond-shaped spaces between the layers of the filament bands will be reduced and eventually completely filled up with filament material until complete coverage of the mandrel is effected. While this is going on, the intermeshing of bands will continue forming herringbone patterns representing intermeshing of filament bands at the crossover positions of righthand and lefthand helices. The layers of intersecting strands or bands of glass filaments depicted in the figures of the accompanying drawing were built up by the above described method of filament winding. It will be understood that the selection of the number of filament winding circuits to bring the filament band back adjacent to location on the mandrel surface of the initial starting position, and the helix angle of winding will be governed largely by the strength requirements of the article in relation to its intended use.

These bands of filaments may have a curable thermosetting resin binder applied to the filaments thereof, at or adjacent to the filament delivery carriage, or the binder may be applied at the position where the filaments engage the mandrel. What is important, however, is that the binder be kept at a minimum commensurate with the securing of the filaments together, with the filling of any spaces between them, and with the securing of the filament bands to adjacent filament bands. As the winding proceeds, any excess binder will be squeezed outwardly from between the filaments so that the quantity of binder supplied may be reduced as the winding continues. Thus a structural article, such as a pressure vessel of desired wall thickness, can be formed whose body is made up principally of strong fiber glass filaments directed at angles to resist both longitudinal and transverse stress. Little space is wasted with binder so that as wall thickness increases it is as a result of the addition of filaments, with direct increase in strength. Such an article, though of moderate thickness, can have high bursting strength imparted thereto.

Upon coverage of the winding mandrel surface with one or more layers of intermeshing helical glass filament windings as described above, the winding operation is temporarily stopped or interrupted for placement of a reinforcing member for each functional opening to be subsequently cut out of the structural shell of wall-forming filamentary material. As previously described, the reinforcing members of this invention, one embodiment of which is figuratively illustrated in FIG. 2 of the drawing, are positioned on the surface of the already placed wall-forming filamentary material so that the opening in each such reinforcing member registers over the area of said wall-forming filamentary material to be cut out to form a functional opening.

Upon placement of a peripherally wound reinforcing member for each functional opening to be subsequently cut out of the structural shell of wall-forming filamentary material, the winding operation is recommenced to lay down an addition layer or layers of intermeshing helical glass filament windings which completely cover the initial windings of wall-forming glass filaments and reinforcing member or members and expose a new surface for placement of subsequent reinforcing members. When necessary, these operations are repeated, alternately applying layers of wall-forming glass filaments and reinforcing members to produce a reinforced structural wall having the necessary strength properties, whereupon the structural layup is cured and the functional openings are cut out as previously described.

The reinforcing members of this invention are prepared by peripherally winding continuous glass filaments, or other suitable continuous filament material, preimpregnated or coated with a curable thermosetting resin binder, onto an axial core form between two parallel rigid plates faced with a suitable mold release agent, and spaced apart on the axis of the winding device a distance substantially equal to the desired thickness of the reinforcing member, somewhat like winding thread on a spool, for example. The winding device is continuously rotated until the desired diameter or width of reinforcing member which may be required has been built up. The peripherally wound reinforcing member thus prepared may then be chilled to increase the resin binder stiffness, or it may be allowed to partially cure to accomplish the same purpose. After removal of the wound reinforcing member from the winding device, it can be distorted as required to follow desired contours when manually placed on the surface of the filament wound article which is in process of manufacture, thus promoting optimum bonding to the primary structure. This is an important advantage of the peripherally wound reinforcing members of this invention in comparison to reinforcing members made of solid sheet material which are too rigid to conform to desired contours, and may lead to poor bonding.

It has been previously pointed out that the reinforcing members of this invention should desirably be made very thin, so that they can be used in multiples for developing a maximum shear area of contact without unduly thickening the wall structure around the periphery of a functional opening. In general, the reinforcing members of this invention will range in thickness from about $1/64$ inch to about $3/64$ inch, and the thickness in any particular case will depend on several factors, including, for example, wall thickness, internal pressures developed within the vessel or article, strength requirements, etc., and approximate values based on engineering requirements can be readily ascertained by simple trial. It will also be apparent that the diameter or width of the reinforcing members of this invention will also depend on several factors, including, for example, shear area of contact required, wall thickness, internal pressures developed within the vessel or article, strength requirements, etc., and approximate values based on engineering requirements can also be readily ascertained by simple trial.

The shape and size of the core form on which the filaments are wound to produce the reinforcing members of this invention should desirably be substantially the same as the shape and size of the functional opening to be cut out of the structural shell of wall-forming filamentary material. This assures that the opening in the reinforcing member will have substantially the same shape and size as the desired functional opening, thus greatly simplifying assembly operations. The core form on which the reinforcing members are wound may be of any desired shape, such as, for example, circular, oval, triangular, square, rectangular, or any other polygonal shape, as necessary to conform to the shape of the functional opening to be made in the structural shell of wall-forming filamentary material.

For most purposes continuous glass filaments are preferred for winding the reinforcing members of this invention, since such filaments are fully compatible with the glass filaments of the primary structure, and thus lead to development of optimum strength properties in the finished articles. However, the invention is not limited to reinforcing members of continuous glass filaments. More particularly, this invention contemplates employment of any filamentary material in continuous filament or thread form which satisfies engineering strength requirements. For example, where a filamentary material having a lower modulus of elasticity than glass filaments is required, continuous rayon filaments have been found to be quite satisfactory, and in fact preferred, for some purposes.

The reinforcing members of this invention can be wound with single continuous filaments or threads formed by twisting two or more such filaments together, or with a plurality of parallel continuous filaments or threads in band-like or strand-like form, or with circularly woven continuous filaments or threads.

In the process of winding the reinforcing members of this invention, it is important that the resin binder be kept at a minimum commensurate with the securing of the filaments of the winding together. Excess resin tends to be confined in the narrow slot between the forming plates of the winding device, thus building up a hydrostatic pressure which interferes with compact winding of the filaments. It has been found that excess resin can be easily avoided, however, by simultaneously winding two strands of filamentary material, one prewetted with resin binder and one dry, thus yielding a system in which the resin binder content is substantially appropriate for the purpose intended.

Preferably the same curable thermosetting resin binder employed to impregnate the layers of wall-forming filamentary material should be employed to impregnate the peripherally wound filaments of the reinforcing members since the same resin binder common to both promotes the optimum bonding of the reinforcement members to the primary layers of wall-forming filamentary material. This in turn promotes a more dependable shear strength between the surfaces of the reinforcing members and the structural windings of wall-forming filamentary material.

Any curable thermosetting resin can be employed as the binder for the purposes of this invention. A great variety of such resins are known in the art, and include by way of example such materials as epoxy compounds, alkyd resins, phenol aldehyde and urea aldehyde resins, melamine aldehyde resins, and other polyfunctional resinous materials capable of forming three dimensional cross-linked polymers when cured. Such thermosetting resins in the uncured state are liquid, and are applied to the filamentary material by any suitable means, such as by immersion of the filamentary material in the uncured resin, by spraying, by doctor-blade application, by roller coat application, and the like. The choice of uncured thermosetting resin in any particular case will depend largely on economics and end use application of the molded structure.

Curing of the thermosetting resins employed in this invention by heating follows conventional prior art practice, and it is customary for the manufacturers of such resins to furnish curing instructions relative to proper temperature and pressure ranges and curing times necessary to convert their resins to the insoluble, infusible, three dimensional cross-linked polymeric state.

Figure 5:
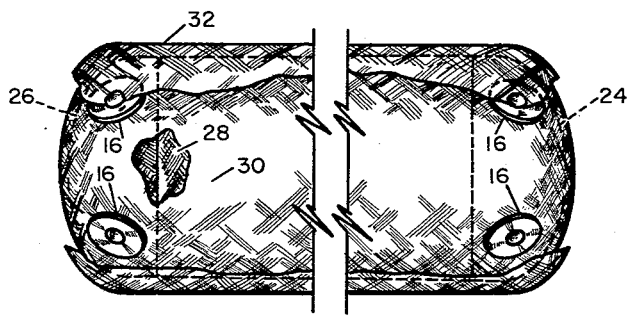
FIG. 5 is an elevation of a structural article in accordance with this invention, with portions of the wall-forming filamentary material cut away to show structural details of a preferred embodiment of the invention.

FIG. 5 illustrates an embodiment of a structural article in accordance with this invention having a plurality of reinforced functional openings in each of the ovaloid end walls of the article. In this embodiment there are four functional openings in each of the ovaloid end walls, the openings in each ovaloid end wall being equally spaced on the circumference of a circle in a plane perpendicular to the central longitudinal axis of the article and projected through the centers of said openings. It will be understood, however, that the invention is not limited either with respect to the number or location of such functional openings, since the invention contemplates structural articles having any number of functional openings, reinforced in accordance with this invention, in any desired location.

Although such an article can be, and has been, built up wholly on a winding mandrel as set forth hereinabove, it has been found more expedient and desirable to fabricate ovaloid end wall shells 24 and 26 with reinforcing members incorporated thereinto on an ovaloid mold form in place of a winding mandrel as more fully described hereinafter, thereafter assembling and fitting these formed end wall shells to the ends of a suitably prepared cylindrical mandrel 28, such for example as a hollow plaster casting, or other readily disintegratable and/or disposable material, mounting the assembly in a lathe-like machine, and then applying an additional layer 30 of intersecting helical filament windings over the ovaloid end wall shells and mandrel surface. The invention is not limited to the use of a disintegratable mandrel, however, since it is also contemplated to fabricate a rocket motor casing, for example, directly on a preformed solid propellant grain by the method of this invention, providing, of course that some free space is provided in the grain directly back of the area or areas of wall-forming filamentary material to be cut out to form functional openings. In the embodiment illustrated in FIG. 5, an additional reinforcing member 16 for each functional opening to be formed may then be positioned on layer 30 so that the axial hole in each reinforcing member registers over the area of wall-forming filamentary material to be cut out to form a functional opening, whereupon a final covering layer 32 of helical filament windings is applied over the whole assembly which is then cured to integrally bond the several elements of the structure together, and the functional openings are then cut out as previously described.

In further describing the present invention with reference to the embodiment illustrated in FIG. 5, reference will be had to the sequential molding method described in U.S. application Serial No. 64,946, filed on October 25, 1960 by Richard E. Young, for fabrication of the ovaloid end wall shells having reinforcing members incorporated thereinto. In this embodiment, one or more layers of wall-building filamentary material impregnated with a curable thermosetting resin in the form of a flat mat of intersecting glass filament strands is placed over the convex surface of an ovaloid male mold form, and a thin washer-like reinforcing member of peripherally wound filamentary material for each functional opening to be cut in the structural shell of wall-forming filamentary material, and also impregnated with a curable thermosetting resin binder, is positioned on the surface of the thus placed mat of wall-forming filamentary material so that the axial hole in each such reinforcing member registers over the area of said wall-forming filamentary material to be cut out to form a functional opening, whereupon another mat of intersecting glass filament strands is applied over the initially placed mat and reinforcing members. When necessary, additional reinforcing members and additional mats of intersecting glass filament strands impregnated with a curable thermosetting resin binder may be alternately applied to produce a reinforced structural wall having the necessary strength properties.

In accordance with the description of sequential molding in U.S. application Serial No. 64,946, an inflated flexible bag is then brought into initial pressure contact with the assembled structural layup on the ovaloid mold form at a locus in the central area of the layup, generally over the highest point of the mold form, to force the impregnated filamentary material at said locus of initial contact against the mold form, and thereafter progressively enveloping all areas of the assembled layup over the mold form by the inflated flexible bag from said locus of initial pressure contact outwardly in all directions to the extremity of the mold form. The structural layup of multiple layers of wall-forming filamentary material with at least one interposed reinforcing member for each functional opening to be cut out, and impregnated with curable thermosetting resin binder, is then heated while under the positive pressure of the enveloping inflated flexible bag to cure the thermosetting resin therein and integrally bond the several elements of the structural layup together into a hardened ovaloid wall or shell of intermeshing strands of glass filaments having reinforcing members of peripherally wound filamentary material incorporated and integrally bonded thereinto.

The importance of the above described method of molding, termed "sequential molding," is that any air in the impregnated filamentary material, and excess uncured thermosetting resin are squeezed out of the impregnated filamentary material ahead of the progressively advancing pressure front, thus insuring a molded structure having a substantially uniform distribution of structural material, and free of air pockets or bridging of wall-building filamentary material adjacent to reinforcing members. The uniformity of molding thus obtained assures uniformity of strength properties in the molded ovaloid shell.

The mats of intersecting strands of glass filaments for fabrication of the above ovaloid end shells can be conveniently prepared by applying a plurality of intermeshing helical windings of continuous glass filament strands on the surface of a cylindrical winding mandrel of suitable length and diameter by means of a filament delivery carriage which travels back and forth from one end of the mandrel to the other as the mandrel rotates, as described hereinabove, to generate complete coverage of the mandrel surface to the thickness desired, with coating and impregnation of the windings with a curable thermosetting resin. The cylinder of applied wrappings thus prepared is then cut or slit longitudinally along the mandrel, and the end windings are removed by cutting, thus leaving a flat rectangular sheet or mat of intermeshing strands of glass filament material impregnated with a curable thermosetting resin binder.

The ovaloid end shells 24 and 26 are then machined and fitted to the ends of a suitably prepared mandrel 28 and assembled in a lathe-like machine, and a layer of the desired thickness of intermeshed helical wrappings of glass filament strands 30 impregnated with a curable thermosetting resin binder is applied over the assembled shells 24, 26 and mandrel 28 by means of a filament delivery carriage which travels back and forth from one end of the lathe-like machine to the other as the assembled shells are rotated therein. Filament winding is then temporarily interrupted for placement of a reinforcing member of peripherally wound filamentary material 16 impregnated with a curable thermosetting resin for each functional opening to be subsequently cut out, whereupon filament winding is recommenced to apply a final covering of helical wrappings of intermeshing filament strands of the desired thickness. The whole structural layup is then cured under suitable conditions of temperature and pressure to integrally bond all parts of the assembled structure together, whereupon the desired functional openings are cut out as previously described, and the forming mandrel is disintegrated or otherwise disposed of, except, of course, in embodiments wherein the mandrel is a preformed solid propellant grain.

This invention contemplates the use of liners or transfer sheets between the surfaces of the wall-forming filamentary material being fabricated and molded and the surfaces of the forming and molding elements employed for such fabrication and molding, such as mandrel surfaces, mold forms, molding bag, and the like. Such liners or transfer sheets improve the surface of the molded piece, prevent adhesion of the filamentary material to the forming and molding elements employed, and otherwise facilitate the forming and molding operations. Such liners are conventional in the molding art, and are flexible, have sufficient extensibility to conform faithfully to the desired molded form, are preferably resistant to the molding temperatures employed and do not adhere to the molded article. Conventional mold release agents such as solid oils, waxes, silicones, stearic acid, and the like, may also be employed to facilitate removal of the molded articles from forming and molding surfaces.

The following example sets forth a specific embodiment of the invention. It is to be understood, however, that the invention is in no way limited to this example, since this invention may be practiced by the use of various modifications within the scope of the invention as described herein.

Example

This example describes the preparation of a cylindrical vessel approximately five feet long, 36 inches inside diameter, with walls approximately 0.2 inch thick, and having four reinforced functional openings, each 4 inches in diameter, in each of the ovaloid end walls of the vessel, the openings in each ovaloid end wall being spaced equally on the circumference of a circle in a plane perpendicular to the central longitudinal axis of the vessel and approximately 6 inches from the end of the vessel and projected through the centers of said openings.

The glass filament material for fabricating the walls of the vessel and the reinforcing rings was in the form of strands of a 12-end roving, each end containing 204 continuous monofilaments of glass each approximately 0.0002 inch in diameter.

Liquid uncured thermosetting epoxy resin designated as Epon Resin 828, catalyzed prior to use with Epon Curing Agent CL (Shell Chemical Company, 380 Madison Avenue, New York, N.Y.), was employed as the binder for fabricating all parts of the vessel. The resin binder was applied by running the glass filament material through a reservoir of the liquid uncured resin and wiping off excess resin.

The layers of wall-building filamentary material in the form of flat mats of intersecting glass filament strands for fabrication of the ovaloid end wall shells were prepared on a winding mandrel by winding a 12-strand ribbon of the above glass filament material, coated with the above catalyzed uncured Epon 828 resin, in a helix at 45° continuing from one end of the winding mandrel to the other and reversing over the ends as previously described. This system of winding deposited the glass filament material in intersecting right and left hand helices which progressed uniformly to generate complete coverage of the mandrel surface. Winding was continued until the thickness of the applied wrappings was approximately 0.02 inch, whereupon winding was discontinued, and the glass filament composite was cut longitudinally along the mandrel, and the end windings were removed by cutting, leaving a rectangular sheet of intermeshing glass filament strands impregnated with uncured thermosetting resin, in which all filaments were laid at 45° to the sheet edges. Half of the glass filament material was oriented at 45° in one direction and the other half was oriented at 45° in the opposite direction, thus intersecting at 90°. Each mat thus prepared was then trimmed to proper blank size for subsequent forming of the ovaloid end wall shells.

The reinforcing rings were prepared by circumferentially winding a pair of continuous glass filament strands under tension, one dry and one coated with catalyzed Epon resin 828, on a core form 4 inches in diameter between parallel plates spaced approximately 1/32 inch apart to a diameter of 8 inches, whereupon the wound rings were partially cured to facilitate handling.

The two ovaloid end wall shells for the vessel were preformed on an ovaloid mold form 36 inches in diameter at its base and approximately 15 inches high from its apex to the center of its base. The convex surface of the mold form was prepared for the molding operation by applying a thin film of a silicone mold release agent designated as Dow Corning No. 7 Compound (Dow Corning, Corp., 592 Saginaw Road, Midland, Michigan) whereupon a previously prepared mat of intersecting glass filament strands impregnated with catalyzed uncured Epon Resin 828, as described above, was laid over the mold form. A reinforcing ring of circumferentially wound glass filament material, as described above, for each of the four functional openings to be subsequently cut out was then placed on the glass filament mat, and another glass filament mat was applied thereover. This was followed by the alternate application of two more reinforcing rings for each functional opening and two more glass filament mats. The composite layup was then subjected to the sequential molding technique, previously described hereinabove, by lowering a flexible molding bag inflated to a pressure between 5 and 10 pounds per square inch, and having a thin film of Dow Corning No. 7 Compound applied to the surface thereof as mold release agent, at the rate of approximately 2 inches per minute by means of a hydraulic ram until the entire composite layup over the mold form was enveloped by the molding bag. The pressure in the molding bag was increased to approximately 20 pounds per square inch, and the temperature of the molding assembly was elevated to approximately 250° F. by heating elements in the mold form, and the pressure and temperature were maintained for 2 hours to cure the thermosetting resin and integrally bond the several elements of glass filament material in the composite layup together to produce a hard, rigid dome-shaped shell approximately 0.08 inch thick between the reinforced areas.

These ovaloid end wall shells were then machined at their bases to a feathered edge, and were fitted to the two ends of a liner covered hollow plaster mandrel, and the whole assembly was mounted with suitable axial pole fittings in a lathe-like machine. A covering layer approximately 0.02 inch thick of intersecting helical glass filament windings was then applied over the liner covered mandrel surface and ovaloid end wall shells by winding a 12-strand ribbon of the above glass filament material, coated with the above catalyzed uncured Epon 828 resin, in a helix at approximately 15° continuing from one end of the assembly to the other and reversing over the ends to deposit the glass filament material in intersecting right hand and left hand helices which progressed uniformly to generate complete coverage of the assembly. Filament winding was then temporarily interrupted for placement of another reinforcing ring of circumferentially wound glass filaments for each functional opening to be subsequently cut out, whereupon filament winding as described above was recommenced to apply a final covering layer of intersecting helical filament windings approximately 0.2 inch thick. The completed structural layup was then cured for 2 hours at approximately 250° F. to integrally bond all parts of the assembled structure together. After curing, the wall-forming glass filaments within the area bounded by the periphery of the axial hole in the annular reinforcing rings was then cut out to produce the desired functional openings, and the plaster form was disintegrated and disposed of.

From the foregoing description, it will be seen that the present invention is a valuable contribution in the manufacture of structural articles such as pressure vessels, rocket motor casings, pipes, and the like, having walls derived from glass filament material bonded with a thermosetting resin, and having one or more functional openings formed by severing the structural filament material. The invention provides such articles having structural reinforcement in the portion of the wall surrounding each functional opening formed therein by cutting or severing the structural filaments of which the wall is made. The invention also provides methods for reinforcing the portion of the wall of such articles surrounding any functional opening formed therein by cutting or severing the structural wall-forming filaments. It will be appreciated that the invention may be practiced by the use of various modifications and changes without departing from its spirit and scope with only such limitations placed thereon as are imposed by the appended claims.

What I claim and desire to protect by Letters Patent is:

1. A structural article having a wall of multiple layers of intermeshed helical filament windings integrally bonded together with a cured thermosetting resin binder;
   (a) said wall having at least one opening therethrough which severs said windings;
   (b) said wall having as reinforcement in the portion thereof surrounding each said opening at least one thin washer-like member interposed between layers of intermeshed helical filament windings and integrally bonded thereto;
   (c) said member being composed of peripheral windings of continuous filament material, and having a preformed axial hole;
   (d) said member being disposed so that the preformed hole therein is in coaxial alignment with said opening and substantially congruent with said opening.

2. A structural article in accordance with claim 1 in which said helical filament windings are glass.

3. A structural article having a wall of multiple layers of intermeshed helical filament windings integrally bonded together with a cured thermosetting resin binder;
   (a) said wall having at least one opening therethrough which severs said windings;
   (b) said wall having as reinforcement in the portion thereof surrounding each said opening a plurality of thin washer-like members interposed between layers of intermeshed helical filament windings and integrally bonded thereto;
   (c) each of said members being separated from other of said members in the reinforcement for each said opening by at least one layer of intermeshed helical filament windings;
   (d) each of said members being composed of peripheral windings of continuous filament material, and having a preformed axial hole;
   (e) all said members in the reinforcement for each said opening being disposed so that the preformed axial holes therein are in coaxial alignment with said opening and substantially congruent with said opening.

4. A structural article in accordance with claim 3 in which said helical filament windings are glass.

5. In the manufacture of a structural article having a wall formed of multiple layers of intermeshing strands of glass filament material integrally bonded together with a cured thermosetting resin and having at least one opening formed in the wall-forming filament material;
   (a) the improvement which comprises alternately applying on a forming surface, as structural elements of said wall, layers of intermeshing strands of wall-forming glass filament material impregnated with a curable thermosetting resin binder and at least one thin washer-like reinforcing member of peripheral windings of continuous glass filament material, said member having a preformed axial hole and also being impregnated with a curable thermosetting resin binder, for each said opening so that the preformed axial hole in each said member registers over and substantially defines the area of wall-forming filament material to be cut out to form each said opening;
   (b) interposing each said reinforcing member between different layers of said wall-forming glass filament material;
   (c) curing the thus assembled structural elements of said wall to integrally bond together said elements;
   (d) and thereafter cutting out only the wall-forming glass filament material of said area to form each said opening.

6. In the manufacture of a structural article having a wall formed of multiple layers of intermeshing strands of glass filament material integrally bonded together with a cured thermosetting resin and having at least one opening formed in the wall-forming filament material;
   (a) the improvement which comprises alternately applying on a forming surface, as structural elements of said wall, layers of intermeshing strands of wall-forming glass filament material impregnated with a curable thermosetting resin binder and a plurality of thin washer-like reinforcing members of peripheral windings of continuous glass filament material, each said member having a preformed axial hole and also being impregnated with a curable thermosetting resin, for each said opening so that the preformed axial holes in all of said members in the reinforcement for each said opening are in coaxial alignment and substantially define the area of wall-forming filament material to be cut out to form each said opening;
   (b) interposing each said reinforcing member between layers of said wall-forming glass filament material so that each said reinforcing member is separated from other said reinforcing members for each said opening by at least one layer of said wall-forming glass filament material;
   (c) curing the thus assembled structural elements of said wall to integrally bond together said elements;
   (d) and thereafter cutting out only the wall-forming glass filament material of said area to form each said opening.

7. A structural article having a wall of multiple layers of intermeshed helical filament windings integrally bonded together with a cured thermosetting resin binder;
   (a) said wall having at least one opening therethrough which severs said windings;
   (b) said wall having as reinforcement in the portion thereof surrounding at least one said opening at least one thin washer-like member interposed between layers of intermeshed helical filament windings and integrally bonded thereto;
   (c) said member being composed of peripheral windings of continuous filament material, and having a preformed axial hole;
   (d) said member being disposed so that the preformed hole therein is in coaxial alignment with said opening and substantially congruent with said opening.

8. In the manufacture of a structural article having a wall formed of multiple layers of intermeshing strands of glass filament material integrally bonded together with a cured thermosetting resin and having at least one opening formed in the wall-forming filament material;
   (a) the improvement which comprises alternately applying on a forming surface, as structural elements of said wall, layers of intermeshing strands of wall-forming glass filament material impregnated with a curable thermosetting resin binder and at least one thin washer-like reinforcing member of peripheral windings of continuous glass filament material, said member having a preformed axial hole and also being impregnated with a curable thermosetting resin binder, for at least one said opening so that the preformed axial hole in each said member registers with and substantially defines the area of wall-forming filament material to be cut out to form said at least one opening;

(b) interposing each said reinforcing member between different layers of said wall-forming glass filament material;

(c) curing the thus assembled structural elements of said wall to integrally bond together said elements;

(d) and thereafter cutting out only the wall-forming glass filament material of said area to form said at least one opening.

References Cited in the file of this patent

UNITED STATES PATENTS

| | | | |
|---|---|---|---|
| Re. 25,241 | Randolph | | Sept. 11, 1962 |
| 26,510 | Miller et al. | | Dec. 20, 1859 |
| 1,425,148 | Subers | | Aug. 8, 1922 |
| 2,150,412 | Berwick | | Mar. 14, 1939 |
| 2,690,412 | Nebesar | | Sept. 28, 1954 |
| 2,691,403 | Goy | | Oct. 12, 1954 |
| 2,744,043 | Ramberg | | May 1, 1956 |
| 2,799,524 | Zagorski et al. | | July 16, 1957 |
| 2,814,313 | Tate | | Nov. 26, 1957 |
| 2,843,153 | Young | | July 15, 1958 |
| 2,866,479 | Mahady et al. | | Dec. 30, 1958 |